(12) United States Patent
Heuer (10) Patent No.: US 8,915,776 B2
(45) Date of Patent: Dec. 23, 2014

(54) AIR OUTLET VALVE AS WELL AS A SYSTEM AND METHOD FOR EMERGENCY VENTILATION OF AN AIRCRAFT CABIN

(75) Inventor: Thomas Heuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1342 days.

(21) Appl. No.: 12/709,887

(22) Filed: Feb. 22, 2010

(65) Prior Publication Data

US 2010/0216385 A1   Aug. 26, 2010

Related U.S. Application Data

(60) Provisional application No. 61/154,512, filed on Feb. 23, 2009.

(30) Foreign Application Priority Data

Feb. 23, 2009   (DE) .......................... 10 2009 010 150

(51) Int. Cl.
*B64D 13/02*   (2006.01)
*B64D 13/00*   (2006.01)
(52) U.S. Cl.
CPC ...................................... *B64D 13/00* (2013.01)
USPC ................. 454/71; 454/76; 454/255; 244/1 R
(58) Field of Classification Search
CPC ......... B64D 13/02; B64D 13/04; B60H 1/248
USPC ......... 454/70–74, 75, 76, 255, 284, 335, 358, 454/363; 137/601.17; 244/129.5
See application file for complete search history.

(56) References Cited

U.S. PATENT DOCUMENTS 3,486,721 A * 12/1969 Myczinski .................... 244/53 R
3,544,045 A * 12/1970 Butscher ..................... 244/129.1

(Continued)

FOREIGN PATENT DOCUMENTS

| DE | 19713125 A1 | 10/1998 |
|---|---|---|
| DE | 102008056417 A1 | 5/2010 |
| DE | 102008058451 A1 | 5/2010 |

*Primary Examiner* — Kang Hu
*Assistant Examiner* — Dana Tighe
(74) *Attorney, Agent, or Firm* — The Webb Law Firm (57) ABSTRACT

An air outlet valve for use in an aircraft is adapted during normal operation of the aircraft as a component of a cabin pressure control system for adjusting a desired pressure level in an aircraft cabin to remove air from an interior of the aircraft into the environment around the aircraft. The air outlet valve is further adapted during emergency ventilation operation of the aircraft as a component of a system for emergency ventilation of the aircraft cabin to introduce air from the environment around the aircraft into the interior of the aircraft. The air outlet valve comprises a nose-side valve flap, which is pivotable about an axis and is adapted to open or close a nose-side portion of an air outlet valve aperture, and a tail-side valve flap, which is pivotable about an axis and is adapted to open or close a tail-side portion of the air outlet valve aperture. A portion of the tail-side valve flap that in the open state of the tail-side valve flap projects into an air stream flowing around an aircraft skin during cruising of the aircraft is greater than a portion of the nose-side valve flap that in the open state of the nose-side valve flap projects into the air stream flowing around the aircraft skin during cruising of the aircraft.

10 Claims, 4 Drawing Sheets

(56) References Cited

U.S. PATENT DOCUMENTS

| | | | |
|---|---|---|---|
| 3,860,200 A * | 1/1975 | Petrushka | 244/207 |
| 4,203,566 A | 5/1980 | Lord | |
| 5,105,729 A | 4/1992 | Signoret et al. | |
| 6,273,136 B1 * | 8/2001 | Steinert et al. | 137/630 |
| 8,439,061 B2 * | 5/2013 | Baumann | 137/15.1 |
| 8,484,894 B2 * | 7/2013 | Sakurai et al. | 49/163 |
| 2010/0001127 A1 * | 1/2010 | Petrac | 244/1 R |
| 2010/0096503 A1 * | 4/2010 | Tanner et al. | 244/129.4 |

* cited by examiner

FIG 1  PRIOR ART flying direction

FIG 2  PRIOR ART flying direction

FIG 7 flying direction

FIG 8 flying direction

AIR OUTLET VALVE AS WELL AS A SYSTEM AND METHOD FOR EMERGENCY VENTILATION OF AN AIRCRAFT CABIN

CROSS-REFERENCE TO RELATED APPLICATIONS

This application claims priority to German Application No. 10 2009 010 150.0, filed Feb. 23, 2009 and to U.S. Provisional Application No. 61/154,512, filed Feb. 23, 2009.

BACKGROUND OF THE INVENTION

1) Field of the Invention

The invention relates to an air outlet valve for use in an aircraft which is adapted during normal operation of the aircraft as a component of a cabin pressure control system for adjusting a desired pressure level in an aircraft cabin to remove air from an interior of the aircraft into the environment around the aircraft, and which is further adapted during emergency ventilation operation of the aircraft, when the aircraft cabin can no longer be supplied with sufficient breathable air by an aircraft air-conditioning system, as a component of a system for emergency ventilation of the aircraft cabin to introduce air from the environment around the aircraft into the interior of the aircraft.

2) Discussion of the Prior Art

At present, in passenger aircraft a so-called air-assisted air-conditioning system is conventionally used to air-condition the aircraft cabin. The aircraft air-conditioning system is used to cool the aircraft cabin, which would otherwise become too warm as a result of thermal loads, such as for example solar irradiation, body heat of the passengers and waste heat from equipment on board the aircraft. The air-conditioning system moreover supplies enough fresh air into the aircraft cabin to ensure that there is a specified minimum oxygen content in the aircraft cabin. Finally, the air-conditioning system is used to keep the pressure in the aircraft cabin at a level higher than the atmospheric pressure when the aircraft is flying above a specific altitude. The cabin internal pressure is controlled by means of a cabin pressure control system, which comprises controllable air outlet valves disposed in the fuselage of the aircraft.

The air outlet valves of the cabin pressure control system are disposed in the region of a skin of the aircraft fuselage and conventionally comprise one or two flaps that are pivotable about an axis. The pivot axis or axes of the flap(s) may be positioned centrally or laterally relative to the flap(s). For controlling the cabin internal pressure, the air outlet valves are controlled in dependence upon the pressure prevailing in the aircraft cabin and upon the operating state of the aircraft. During cruising of the aircraft the air outlet valves are usually almost closed. In contrast thereto, the air outlet valves are as a rule fully open when the aircraft is situated on the ground, i.e. the setting angle of the flap(s) is ca. 90° in order to guarantee complete depressurization of the aircraft cabin.

If during flight a defect in the aircraft air-conditioning system arises that has the effect that the aircraft cabin can no longer be supplied with sufficient fresh air, the aircraft descends to a safe altitude, at which it is no longer necessary to keep the pressure in the aircraft cabin at a level higher than the atmospheric pressure, and flies unpressurized to the destination airport or to an airfield situated closer by. In order to supply the necessary breathable air for the passengers during this period, it is known for example from the non-pre-published DE 10 2008 058 451 to provide aircraft with one or more emergency ram-air inlets, through which ram air from the environment around the aircraft may be directed into the interior of the aircraft.

From the likewise non-pre-published DE 10 2008 056 417 a system for emergency ventilation of an aircraft cabin is further known, which comprises a first valve disposed in a first aircraft fuselage region as well as a second valve disposed in a second aircraft fuselage region spaced apart along a longitudinal axis of the aircraft from the first aircraft fuselage region. The first and the second valve are used during normal operation of the aircraft as air outlet valves of an aircraft cabin pressure control system. During emergency ventilation operation the first and the second valve may however be controlled by an electronic control unit in such a way that a negative-pressure-driven emergency ventilation of the aircraft cabin arises, in which air from the environment around the aircraft is supplied through the open first valve into the first aircraft fuselage region and directed from the first aircraft fuselage region into the aircraft cabin. After flowing through the aircraft cabin the air is directed into the second aircraft fuselage region and finally removed through the open second valve into the environment around the aircraft.

Figure 1:
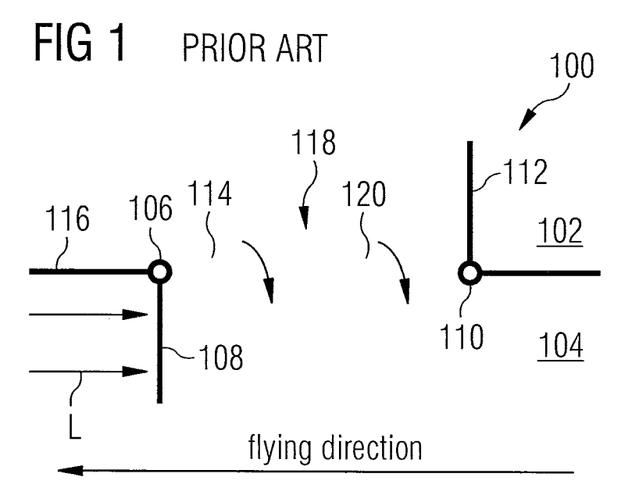

Known air outlet valves for use in a cabin pressure control system have the drawback that, because of their construction, they are completely incapable or capable only to a limited extent of directing air from the environment around the aircraft into the interior of the aircraft. For example, a conventional air outlet valve having flaps that are pivotable about pivot axes disposed laterally relative to the flaps cannot be used in a system for emergency ventilation of an aircraft cabin to direct air from the environment around the aircraft into the aircraft cabin. Rather, an—in relation to the flying direction of the aircraft—front or nose-side flap of the air outlet valve, as shown in FIG. 1, prevents air from being able to pass from the environment around the aircraft into the interior of the aircraft. A valve configured in this way is therefore usable exclusively as an air outlet valve.

Figure 2:
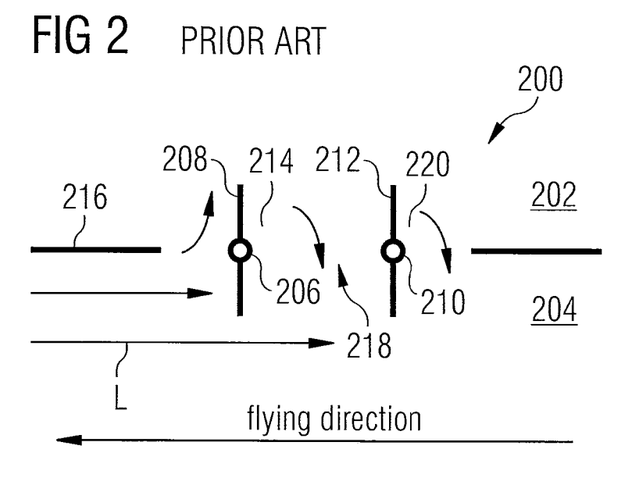

Admittedly, in the case of an air outlet valve having flaps that are pivotable about pivot axes disposed centrally relative to the flaps, a ram pressure arising at an—in relation to the flying direction of the aircraft—front or nose-side flap of the air outlet valve, as depicted in FIG. 2, ensures that air may be directed from the environment around the aircraft into the interior of the aircraft. However, in a region of the air outlet valve situated between the pivot axis of the nose-side flap and the pivot axis of an—in relation to the flying direction of the aircraft—rear or tail-side flap, pressure conditions arise which have the effect that air passes from the interior of the aircraft into the environment around the aircraft. This applies also to a region of the air outlet valve situated—in relation to the flying direction of the aircraft—behind the pivot axis of the tail-side flap. Such an air outlet valve is therefore also suitable only to a limited extent for use in a system for emergency ventilation of an aircraft cabin.

SUMMARY OF THE INVENTION

The underlying object of the invention is to provide an air outlet valve that during normal operation of the aircraft as a component of a cabin pressure control system for adjusting a desired pressure level in an aircraft cabin is capable of directing air from an interior of the aircraft into the environment around the aircraft but in an emergency situation, in which the aircraft cabin can no longer be supplied with sufficient breathable air by an aircraft air-conditioning system, as a component of a system for emergency ventilation of the aircraft cabin may ensure the introduction of sufficient air from the environment around the aircraft into the interior of the aircraft. A further underlying object of the invention is to provide a system for emergency ventilation of an aircraft cabin that is equipped with such an air outlet valve as well as a method for emergency ventilation of an aircraft cabin, in which such an air outlet valve is used.

An air outlet valve according to the invention for use in an aircraft is adapted during normal operation of the aircraft as a component of a cabin pressure control system for adjusting a desired pressure level in the aircraft cabin to remove air from an interior of the aircraft into the environment around the aircraft. The air outlet valve according to the invention is further adapted during emergency ventilation operation of the aircraft as a component of a system for emergency ventilation of the aircraft cabin to introduce air from the environment around the aircraft into the interior of the aircraft. The air outlet valve comprises a nose-side valve flap that is pivotable about an axis. In its open state the nose-side valve flap opens a nose-side portion of an air outlet valve aperture formed in an aircraft skin. In its closed position, on the other hand, the nose-side valve flap closes the nose-side portion of the air outlet valve aperture. The air outlet valve according to the invention further comprises a tail-side valve flap that is pivotable about an axis. When the tail-side valve flap is in its open state, it opens a tail-side portion of the air outlet valve aperture. In its closed position, on the other hand, the tail-side valve flap closes the tail-side portion of the air outlet valve aperture.

The nose-side and the tail-side valve flap may be disposed immediately adjacent to one another and be adapted to open or close a nose-side and a tail-side portion of a continuous air outlet valve aperture. Alternatively, it is however also conceivable for the nose-side portion of the air outlet valve aperture to be separated by a portion of the aircraft skin from the tail-side portion of the air outlet valve aperture. The pivot axis of the nose-side valve flap and/or the pivot axis of the tail-side valve flap extends/extend preferably parallel to one another and/or at right angles to a longitudinal axis of the aircraft.

When the valve flaps are in their fully closed position, the valve flaps are aligned substantially parallel to the aircraft skin and/or extend flush with the aircraft skin. When the valve flaps during normal operation of the aircraft are used as a component of the cabin pressure control system for adjusting a desired pressure level in the aircraft cabin to remove air from the interior of the aircraft into the environment around the aircraft, the valve flaps are usually in a slightly pivoted position relative to the aircraft skin. Relative to an air stream flowing around the aircraft skin during cruising of the aircraft the valve flaps during normal operation of the aircraft are usually positioned at a setting angle of 7° for controlling the pressure in the aircraft cabin.

In the open state of the valve flaps the setting angle, at which the valve flaps are positioned relative to the air stream flowing around the aircraft skin during cruising of the aircraft, is on the other hand for example 90°. In the open state of the valve flaps, therefore, both a portion of the nose-side valve flap and a portion of the tail-side valve flap project into the air stream flowing around the aircraft skin during cruising of the aircraft. In the case of the air outlet valve according to the invention, the portion of the tail-side valve flap that projects in the open state of the tail-side valve flap into the air stream flowing around the aircraft skin during cruising of the aircraft is greater than a portion of the nose-side valve flap that projects in the open state of the nose-side valve flap into the air stream flowing around the aircraft skin.

The design according to the invention of the air outlet valve achieves the effect that in the open state of the valve flaps it is not just at the portion of the nose-side valve flap that projects into the air stream flowing around the aircraft skin during cruising of the aircraft that a ram pressure arises, which in a region of the nose-side air outlet valve aperture portion situated between an—in relation to the air outlet valve—nose-side portion of the aircraft skin and the pivot axis of the nose-side valve flap effects an inflow of air from the environment around the aircraft into the interior of the aircraft. Rather, an additional ram pressure arises also at the portion of the tail-side valve flap that extends beyond the portion of the nose-side valve flap projecting into the air stream flowing around the aircraft skin during cruising of the aircraft into the air stream flowing around the aircraft skin during cruising of the aircraft. The effect of this additional ram pressure is that air may flow from the environment around the aircraft into the interior of the aircraft also in a region of the air outlet valve aperture that is situated between the pivot axes of the valve flaps.

Compared to conventional air outlet valves, the air outlet valve according to the invention therefore enables the supply of a markedly increased volume rate of airflow from the environment around the aircraft into the interior of the aircraft. The air outlet valve according to the invention is therefore particularly suitable for use in a system for emergency ventilation of the aircraft cabin. A further advantage of the design according to the invention of an air outlet valve is that the improved functional properties of the air outlet valve during emergency ventilation operation of the aircraft do not lead to any functional impairment of the air outlet valve during normal operation of the aircraft, when the air outlet valve is used as a component of the cabin pressure control system for adjusting a desired pressure level in the aircraft cabin to remove air from the interior of the aircraft into the environment around the aircraft.

In principle, the valve flaps of the air outlet valve according to the invention may be configured in such a way that the portion of the tail-side valve flap that projects in the open state of the tail-side valve flap into the air stream flowing around the aircraft skin during cruising of the aircraft extends in the open state of the tail-side valve flap in a direction parallel to the aircraft skin further into the air stream flowing around the aircraft skin during cruising of the aircraft than the portion of the nose-side valve flap that projects in the open state of the nose-side valve flap into the air stream flowing around the aircraft skin during cruising of the aircraft. In other words, the tail-side valve flap, viewed along the pivot axes of the valve flaps, may have a larger dimension than the nose-side valve flap.

A uniform ram pressure at the tail-side valve flap and consequently an optimized air supply from the environment around the aircraft into the interior of the aircraft through the region of the air outlet valve aperture situated between the pivot axes of the valve flaps is however achieved when the portion of the tail-side valve flap that projects in the open state of the tail-side valve flap into the air stream flowing around the aircraft skin during cruising of the aircraft extends in the open state of the tail-side valve flap in a direction at right angles to the aircraft skin further into the air stream flowing around the aircraft skin during cruising of the aircraft than the portion of the nose-side valve flap that projects in the open state of the nose-side valve flap into the air stream flowing around the aircraft skin during cruising of the aircraft. In other words, the tail-side valve flap in a direction at right angles to the pivot axes of the valve flaps preferably has a larger dimension than the nose-side valve flap.

In the air outlet valve according to the invention the pivot axes of the valve flaps may be disposed eccentrically relative to the valve flaps. Preferably, however, the pivot axis of the nose-side valve flap is disposed centrally relative to the nose-side valve flap. Alternatively or in addition thereto, the pivot axis of the tail-side valve flap may also be disposed centrally relative to the tail-side valve flap.

The nose-side valve flap may be adapted to be positioned at a setting angle greater than 90° relative to the air stream flowing around the aircraft skin during cruising of the aircraft. Alternatively or in addition thereto, the tail-side valve flap may also be adapted to be positioned at a setting angle greater than 90° relative to the air stream flowing around the aircraft skin during cruising of the aircraft. By positioning the valve flaps at a setting angle greater than 90° relative to the air stream flowing around the aircraft skin during cruising of the aircraft, the air inflow from the environment around the aircraft into the interior of the aircraft through the air outlet valve aperture may be intensified compared to an operating state of the air outlet valve, in which the valve flaps are positioned at a setting angle of 90° relative to the air stream flowing around the aircraft skin during cruising of the aircraft.

The valve flaps of the air outlet valve according to the invention may be driven for example with the aid of an electric motor. The driving power of the electric motor may be transmitted to the valve flaps by means of a push rod mechanism. The electric motor and the push rod mechanism may be adapted to provide merely a synchronous drive of the valve flaps. Alternatively, however, the electric motor and the push rod mechanism may be adapted to drive the nose-side valve flap and the tail-side valve flap independently of one another, so that the valve flaps may be moved into different positions independently of one another.

In a preferred embodiment of the air outlet valve according to the invention, the tail-side valve flap comprises a cover, which is adapted to close a region of the tail-side air outlet valve aperture portion that is disposed between the pivot axis of the tail-side valve flap and an—in relation to the air outlet valve—tail-side portion of the aircraft skin when the tail-side valve flap is in its open position, in which it opens the tail-side air outlet valve aperture portion. In the region of the tail-side air outlet valve aperture portion that is disposed between the pivot axis of the tail-side valve flap and the—in relation to the air outlet valve—tail-side portion of the aircraft skin, owing to the fact that in this region there is no ram pressure that might lead to an air inflow from the environment around the aircraft into the interior of the aircraft air passes in the open state of the valve flaps from the interior of the aircraft into the environment around the aircraft. With the aid of the cover this undesirable exit of air from the aircraft interior into the environment around the aircraft may be prevented. The air supply into the aircraft cabin during emergency ventilation operation of the aircraft is therefore further improved.

The cover may be designed in the form of a rigid cover and be fastened for example to the pivot axis of the tail-side valve flap. For example the cover may extend substantially at right angles to the tail-side valve flap. Given such a design of the air outlet valve according to the invention, the cover is disposed substantially parallel to the aircraft skin and/or extends flush with the aircraft skin over the region of the tail-side air outlet valve aperture portion that is disposed between the pivot axis of the tail-side valve flap and the—in relation to the air outlet valve—tail-side portion of the aircraft skin when the tail-side valve flap is in its open position, in which it opens the tail-side air outlet valve aperture portion.

A particularly flexible operation of the air outlet valve according to the invention is however possible if the cover is pivotably connected to the pivot axis of the tail-side valve flap. The cover may then for example be aligned substantially parallel to the aircraft skin and/or be positioned flush with the aircraft skin and reliably close the region of the tail-side air outlet valve aperture portion situated between the pivot axis of the tail-side valve flap and the—in relation to the air outlet valve—tail-side portion of the aircraft skin also when the tail-side valve flap is positioned at a setting angle greater than 90° relative to the air stream flowing around the aircraft skin during cruising of the aircraft.

The cover may for example be controllable by means of a control unit of the cabin pressure control system and/or of the system for emergency ventilation of the aircraft cabin into a desired position, in which it opens or closes the region of the tail-side air outlet valve aperture portion that is disposed between the pivot axis of the tail-side valve flap and the—in relation to the air outlet valve—tail-side portion of the aircraft skin. The control unit may be designed for example in the form of an electronic control unit. Preferably, control of the cover independently of control of the tail-side valve flap is possible.

A system according to the invention for emergency ventilation of an aircraft cabin comprises an air outlet valve as described above as well as a control unit, which is adapted to control at least one valve flap of the air outlet valve during emergency ventilation operation of the aircraft into its open state so that air from the environment around the aircraft is directed into the interior of the aircraft through the open valve flap. The control unit may be designed for example in the form of an electronic control unit and be adapted to control the air outlet valve and/or the valve flaps of the air outlet valve on the basis of signals, which are supplied to the control unit and indicate a malfunction of an aircraft air-conditioning system and/or of a system that during normal operation of the aircraft ensures proper ventilation of the aircraft cabin. Preferably the control unit is adapted to switch the operation of the air outlet valve and/or of the valve flaps of the air outlet valve automatically to emergency ventilation operation in response to the detection of a malfunction of the aircraft air-conditioning system and/or of the system that during normal operation of the aircraft ensures proper ventilation of the aircraft cabin.

The control unit of the system according to the invention for emergency ventilation of an aircraft cabin is preferably adapted to control the nose-side valve flap and/or the tail-side valve flap of the air outlet valve in such a way that it is/they are positioned at a setting angle greater than 90° relative to the air stream flowing around the aircraft skin during cruising of the aircraft.

The control unit may further be adapted to control the cover of the tail-side valve flap into a desired position, in which it opens or closes the region of the tail-side air outlet valve aperture portion that is disposed between the pivot axis of the tail-side valve flap and the—in relation to the air outlet valve—tail-side portion of the aircraft skin.

A method according to the invention for emergency ventilation of an aircraft cabin comprises the providing of an air outlet valve as described above. At least one valve flap of the air outlet valve is controlled into its open state so that air from the environment around the aircraft is directed into the interior of the aircraft through the open valve flap of the air outlet valve.

The nose-side valve flap and/or the tail-side valve flap of the air outlet valve is/are preferably controlled in such a way that it is/they are positioned at a setting angle greater than 90° relative to the air stream flowing around the aircraft skin during operation of the aircraft.

The cover of the tail-side valve flap may be controlled into a desired position, in which it opens or closes the region of the tail-side air outlet valve aperture portion that is disposed between the pivot axis of the tail-side valve flap and the—in relation to the air outlet valve—tail-side portion of the aircraft skin.

BRIEF DESCRIPTION OF THE DRAWINGS

There now follows a more detailed description of preferred embodiments of the invention with reference to the accompanying diagrammatic drawings, which show in FIG. 1 a first embodiment of an air outlet valve known from the prior art, FIG. 2 a second embodiment of an air outlet valve known from the prior art, FIG. 3 a first embodiment of an air outlet valve according to the invention during normal operation of an aircraft, FIG. 4 the air outlet valve shown in FIG. 3 during emergency ventilation operation of the aircraft, wherein valve flaps of the air outlet valve are positioned at a setting angle of 90° relative to an air stream flowing around an aircraft skin during cruising of the aircraft, FIG. 5 the air outlet valve shown in FIG. 3 during emergency ventilation operation of the aircraft, wherein the valve flaps of the air outlet valve are positioned at a setting angle greater than 90° relative to the air stream flowing around the aircraft skin during cruising of the aircraft, FIG. 6 a system for emergency ventilation of an aircraft cabin with an air outlet valve according to FIG. 4, FIG. 7 a second embodiment of an air outlet valve according to the invention during normal operation of an aircraft, FIG. 8 the air outlet valve shown in FIG. 7 during emergency ventilation operation of the aircraft, wherein valve flaps of the air outlet valve are positioned at a setting angle of 90° relative to an air stream flowing around an aircraft skin during cruising of the aircraft, FIG. 9 the air outlet valve shown in FIG. 7 during emergency ventilation operation of the aircraft, wherein the valve flaps of the air outlet valve are positioned at a setting angle greater than 90° relative to the air stream flowing around the aircraft skin during cruising of the aircraft, and FIG. 10 a system for emergency ventilation of an aircraft cabin with an air outlet valve according to FIG. 8.

DETAILED DESCRIPTION OF THE PREFERRED EMBODIMENTS

FIG. 1 shows an air outlet valve 100 known from the prior art that is provided for use in an aircraft. The air outlet valve 100 forms a component of a cabin pressure control system of the aircraft and is used to remove air from an interior 102 of the aircraft into the environment 104 around the aircraft in order to adjust a desired pressure level in an aircraft cabin. The air outlet valve 100 comprises a nose-side valve flap 108 that is pivotable about an axis 106 as well as a tail-side valve flap 112 that is pivotable about an axis 110. The nose-side valve flap 108 is adapted to open or close a nose-side portion 114 of an air outlet valve aperture 118 formed in an aircraft skin 116. In a similar fashion, the tail-side valve flap 112 is adapted to open or close a tail-side portion 120 of the air outlet valve aperture 118 formed in the aircraft skin 116.

The pivot axes 106, 110 each are disposed laterally relative to the valve flaps 108, 112. In its open state the nose-side valve flap 108 therefore projects in the region of a nose-side edge of the air outlet valve aperture 118 substantially at right angles to the aircraft skin 116 into an air stream L flowing around the aircraft skin 116 during cruising of the aircraft. The tail-side valve flap 112, on the other hand, in its open state projects in the region of a tail-side edge of the air outlet valve aperture 118 substantially at right angles to the aircraft skin 116 into the interior 102 of the aircraft. The nose-side valve flap 108 projecting in the region of the nose-side edge of the air outlet valve aperture 118 into the air stream L flowing around the aircraft skin 116 during cruising of the aircraft shields the air outlet valve aperture 118 from the air stream L flowing around the aircraft skin 116 during cruising of the aircraft, so that even in the fully open state of the valve flaps 108, 112 no air from the environment 104 around the aircraft may pass into the aircraft interior 102. Rather, because of a local negative pressure behind the nose-side valve flap 108 air flows out of the aircraft interior 102 into the environment 104 around the aircraft. The air outlet valve 100 shown in FIG. 1 is therefore suitable as a component of a cabin pressure control system for adjusting a desired pressure level in the aircraft cabin exclusively for removing air from the interior 102 of the aircraft into the environment around the aircraft.

FIG. 2 shows a further air outlet valve 200 known from the prior art. The air outlet valve 200 is likewise used during normal operation of the aircraft as a component of a cabin pressure control system for adjusting a desired pressure level in the aircraft cabin to remove air from an interior 202 of the aircraft into the environment 204 around the aircraft. A nose-side valve flap 208 that is pivotable about an axis 206 is adapted to open or close a nose-side portion 214 of an air outlet valve aperture 218 formed in an aircraft skin 216. In a similar fashion, a tail-side valve flap 212 that is pivotable about an axis 210 is adapted to open or close a tail-side portion 220 of the air outlet valve aperture 218 formed in the aircraft skin 216.

The air outlet valve 200 shown in FIG. 2 differs from the air outlet valve 100 according to FIG. 1 in that the axes 206, 210 of the valve flaps 208, 212 are disposed, not laterally, but centrally relative to the valve flaps 208, 212. In the open state of the valve flaps 208, 212, therefore, both a portion of the nose-side valve flap 208 and a portion of the tail-side valve flap 212 project in a direction substantially at right angles to the aircraft skin 216 into an air stream L flowing around the aircraft during cruising. In the open state of the valve flaps 208, 212 a ram pressure builds up at the portion of the nose-side valve flap 208 that projects into the air stream L flowing around the aircraft during cruising. This ram pressure has the effect that in a region of the nose-side air outlet valve aperture portion 214 that is delimited by an—in relation to the air outlet valve 200—nose-side portion of the aircraft skin 216 as well as by the pivot axis 206 of the nose-side valve flap 208 air from the environment 204 around the aircraft may pass into the aircraft interior 202. The remaining portions of the air outlet valve aperture 218, i.e. the portion of the air outlet valve aperture 218 situated between the axes 206, 210 of the valve flaps 208, 212 as well as the portion of the air outlet valve aperture 218 situated downstream of the axis 210 of the tail-side valve flap 212, are however shielded from the air stream L flowing around the aircraft skin 216 during cruising of the aircraft by the portions of the valve flaps 208, 212 that project into the air stream L flowing around the aircraft skin 216 during cruising of the aircraft. In these regions of the air outlet valve aperture 218, therefore, a local negative pressure causes air to flow out of the aircraft interior 202 into the environment 204 around the aircraft.

Thus, in the case of the air outlet valve 200 shown in FIG. 2, in the open state of the valve flaps 208, 212 air from the environment 204 around the aircraft may be supplied into the aircraft interior 202 only in a comparatively small region of the air outlet valve aperture 218. In a predominant part of the air outlet valve aperture 218, on the other hand, air passes out of the aircraft interior 202 into the environment 204 around the aircraft. The air outlet valve 200 is therefore suitable only to a very limited extent for using in a system for emergency ventilation of the aircraft cabin to direct air from the environment 204 around the aircraft into the aircraft interior 202 during emergency ventilation operation of the aircraft.

Figure 3:
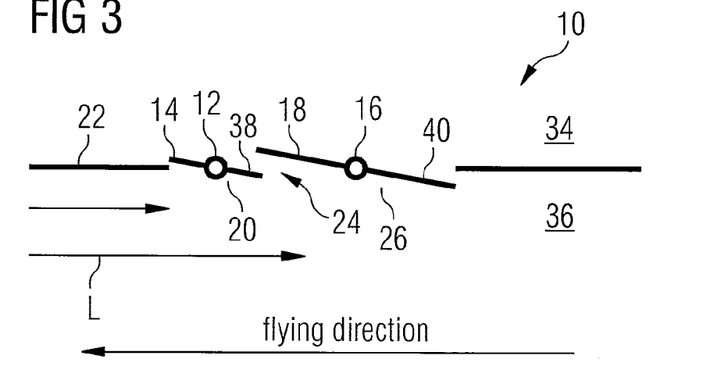
Figure 4:
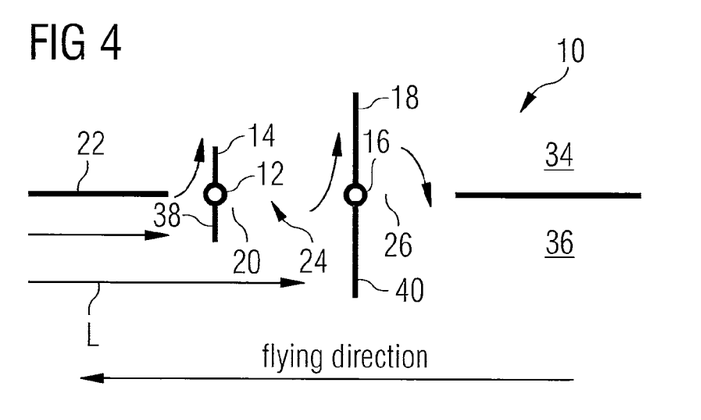
Figure 5:
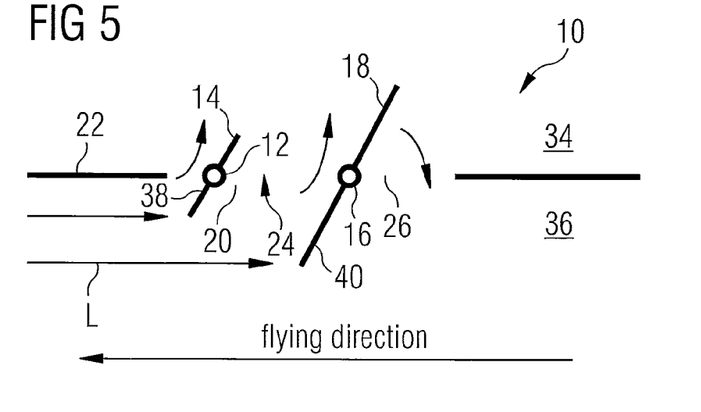

An air outlet valve 10 shown in FIGS. 3 to 5 comprises, in a similar fashion to the air outlet valve 200 shown in FIG. 2, a nose-side valve flap 14 that is pivotable about an axis 12 as well as a tail-side valve flap 18 that is pivotable about an axis 16. The nose-side valve flap 14 is adapted to open or close a nose-side portion 20 of an air outlet valve aperture 24 formed in an aircraft skin 22. The tail-side valve flap 18, on the other hand, is adapted to open or close a tail-side portion 26 of the air outlet valve aperture 24 formed in the aircraft skin 22. The nose-side air outlet valve aperture portion 20 that is opened or closed by the nose-side valve flap 14 has a shorter dimension along a longitudinal axis of the aircraft than the tail-side air outlet valve aperture portion 26 that is opened or closed by the tail-side valve flap 18. When the valve flaps 14, 18 are in their closed position shown in FIG. 3, the nose-side valve flap 14 therefore extends over a shorter distance along the longitudinal axis of the aircraft than the tail-side valve flap 18. The pivot axis 12 of the nose-side valve flap 14 is disposed centrally relative to the nose-side valve flap 14. The pivot axis 16 of the tail-side valve flap 18 is likewise disposed centrally relative to the tail-side valve flap 18.

Figure 6:
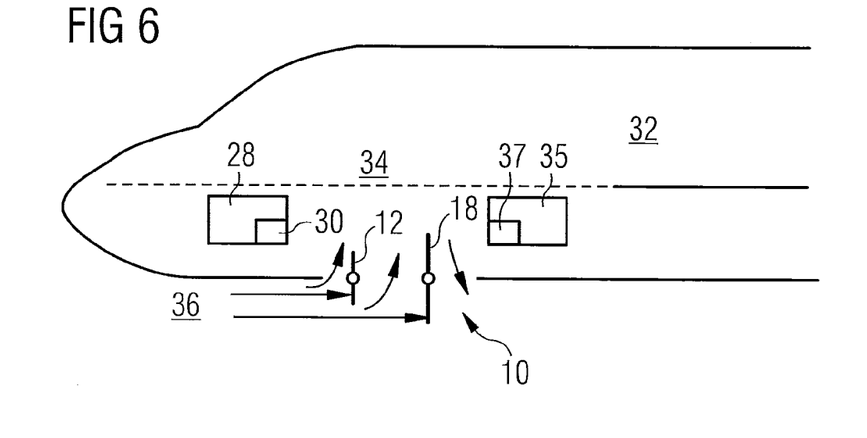

During normal operation of the aircraft the air outlet valve 10 forms a component of a cabin pressure control system 28, which is indicated diagrammatically in FIG. 6, and is controlled by an electronic control unit 30 of the cabin pressure control system 28 in such a way that a desired pressure level arises in an aircraft cabin 32. During normal operation of the aircraft, when the aircraft is at cruising altitude, the valve flaps 14, 18 of the air outlet valve 10 are usually positioned in the position shown in FIG. 3, in which they are positioned at a setting angle of ca. 7° relative to an air stream L flowing around the aircraft skin 22 during cruising of the aircraft and substantially close the air outlet valve aperture 24. Where necessary, for example during an ascent of the aircraft, the valve flaps 14, 18 under the control of the electronic control unit 30 may be closed further in order to remove less air from an interior 34 of the aircraft, in particular from the aircraft cabin 32 into the environment 36 around the aircraft. The pressure in the aircraft cabin 32 is thereby raised to a desired level. The supplying of the aircraft cabin 32 with fresh air is carried out during normal operation of the aircraft by an aircraft air-conditioning system.

If during cruising of the aircraft a defect in the aircraft air-conditioning system arises which has the effect that the aircraft cabin 32 can no longer be supplied with sufficient fresh air, the aircraft descends to a safe altitude, at which it is no longer necessary to keep the pressure in the aircraft cabin 32 at an increased pressure compared to the atmospheric pressure. The supplying of the aircraft cabin 32 with breathable air for persons accommodated in the cabin 32 is carried out during this period by an emergency ventilation system 35, which is likewise diagrammatically indicated in FIG. 6. The system 35 for emergency ventilation of the aircraft cabin 32 comprises an electronic control unit 37. If the electronic control unit 37 receives signals indicating a defect in the aircraft air-conditioning system that impairs proper ventilation of the aircraft cabin 32 and if further conditions are met, the electronic control unit 37 controls the air outlet valve 10, depending on requirements, into the operating state shown in FIGS. 4 and 6 or the operating state shown in FIG. 5.

In the operating state of the air outlet valve 10 shown in FIG. 4 the valve flaps 14, 18 are positioned at a setting angle of ca. 90° relative to the air stream L flowing around the aircraft skin 22 during cruising of the aircraft. With the aircraft skin 22 also the valve flaps 14, 18 form an angle of ca. 90°, so that a portion 38 of the nose-side valve flap as well as a portion 40 of the tail-side valve flap 18 project into the air stream L flowing around the aircraft skin 22 during cruising of the aircraft. The portion 40 of the tail-side valve flap 18 that projects into the air stream L flowing around the aircraft skin 22 during cruising of the aircraft is however greater than the portion 38 of the nose-side valve flap 14 that projects into the air stream L flowing around the aircraft skin 22 during cruising of the aircraft. In particular, the portion 40 of the tail-side valve flap 18 extends in a direction at right angles to the aircraft skin 22 further into the air stream L flowing around the aircraft skin 22 during cruising of the aircraft than the portion 38 of the nose-side valve flap 14.

As may best be seen from FIG. 4, at the portion 38 of the nose-side valve flap 14 that projects into the air stream L a ram pressure builds up and has the effect that, in a region of the nose-side air outlet valve aperture portion 20 that is delimited by an—in relation to the air outlet valve 10—nose-side portion of the aircraft skin 22 and by the pivot axis 12 of the nose-side valve flap 14, air from the environment 36 around the aircraft passes into the aircraft interior 34. In a similar fashion, in a region of the tail-side valve flap 18 that projects beyond the nose-side valve flap 14 into the air stream L a ram pressure builds up and has the effect that also in a region of the air outlet valve aperture 24 that is delimited by the pivot axes 12, 16 of the valve flaps 14, 18 air from the environment 36 around the aircraft passes into the aircraft interior 34. It is only in a region of the tail-side air outlet valve aperture portion 26 that is delimited by the pivot axis 16 of the tail-side valve flap 18 and by an—in relation to the air outlet valve 10—tail-side portion of the aircraft skin 22 that, because of the pressure difference between the aircraft interior 34 and the environment 36 around the aircraft, air may still pass from the aircraft interior 34 into the environment 36 around the aircraft. The quantity of air entering through the air outlet valve 10 is however sufficient for the air outlet valve 10 during emergency ventilation operation of the aircraft to be used as a component of the emergency ventilation system 35 to direct sufficient air from the environment 36 around the aircraft into the interior 34 of the aircraft to ensure adequate ventilation of the aircraft cabin 32.

In order further to improve the inflow of air from the environment 36 around the aircraft into the aircraft interior 34 through the air outlet valve 10, the valve flaps 14, 18 of the air outlet valve 10 may be controlled by the electronic control unit 37 of the emergency ventilation system 35 additionally into the position shown in FIG. 5, in which they are positioned at a setting angle greater than 90° relative to the air stream L flowing around the aircraft skin 22 during cruising of the aircraft. The position of the valve flaps 14, 18 that is shown in FIG. 5 is advantageous particularly if there is a high breathable air supply requirement in the aircraft cabin 32.

The air outlet valve 10 shown in FIGS. 7 to 10 differs from the arrangement shown in FIGS. 3 to 6 in that the tail-side valve flap 18 of the air outlet valve 10 comprises a cover 42, which is adapted to close the region of the tail-side air outlet valve aperture portion 26 disposed between the pivot axis 16 of the tail-side valve flap 18 and the—in relation to the air outlet valve 10—tail-side portion of the aircraft skin 22 when the tail-side valve flap 18 is in its open position, in which it opens the tail-side air outlet valve aperture portion 26. The cover 42 may be fastened rigidly to the pivot axis 16 of the tail-side valve flap 18. In the arrangement shown in FIGS. 7 to 10 the cover 42 is however pivotably connected to the pivot axis 16 of the tail-side valve flap 18 and is controlled into a desired position by the electronic control unit 37 of the emergency ventilation system 35.

Figure 7:
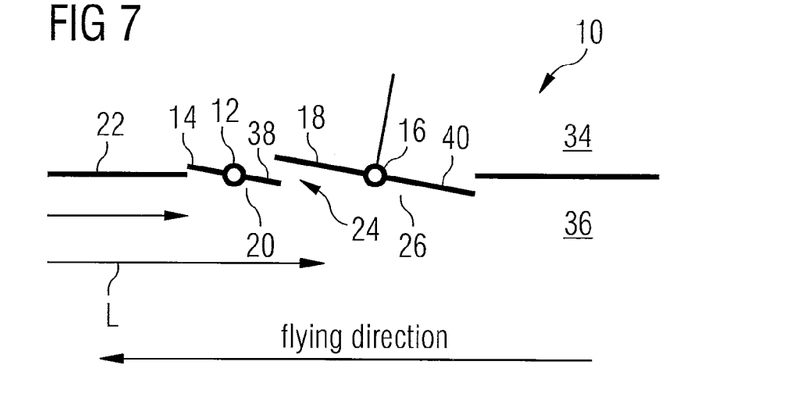
Figure 8:
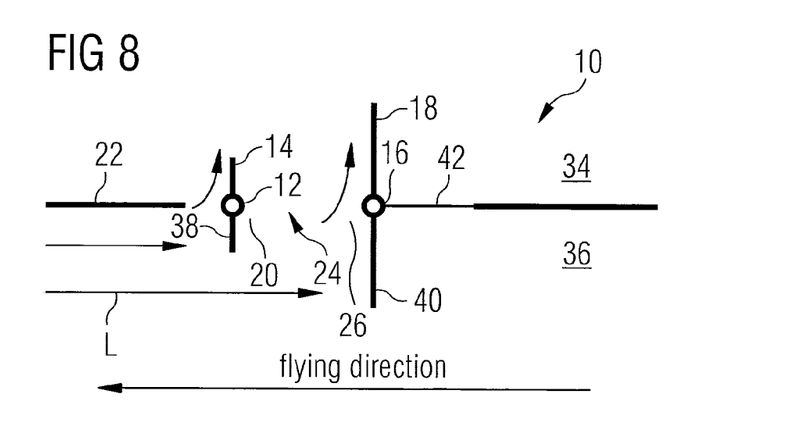
Figure 9:
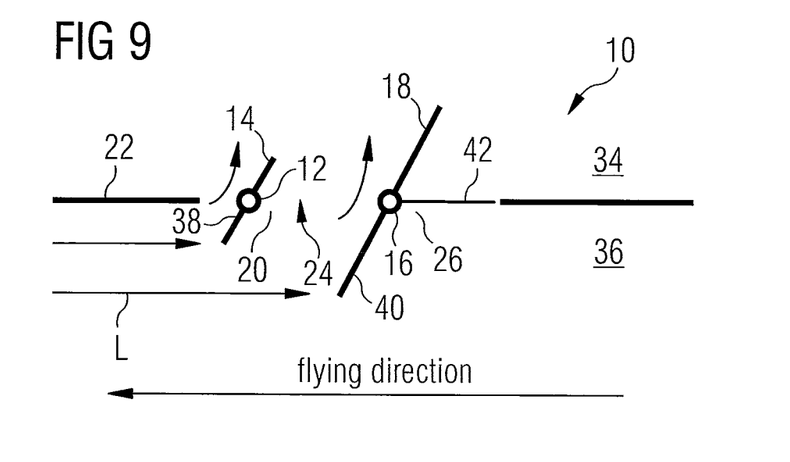
Figure 10:
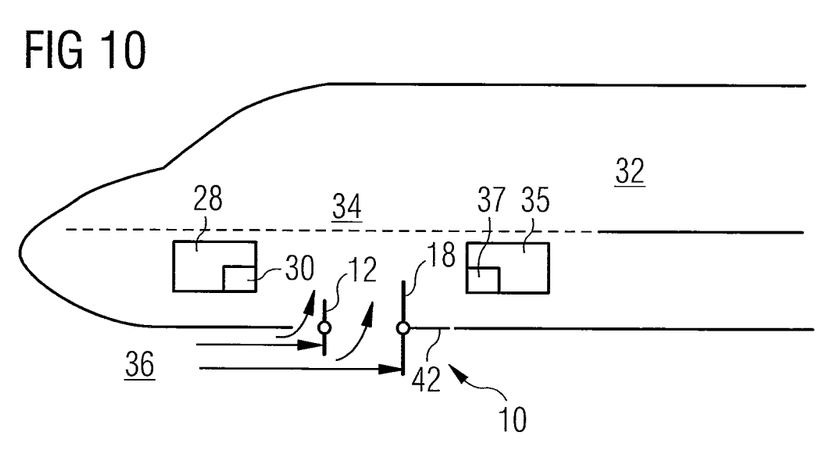

When the valve flaps 14, 18 of the air outlet valve 10 during normal operation of the aircraft, as shown in FIG. 7, substantially close the air outlet valve aperture 24, the cover 42 may extend substantially at right angles to the tail-side valve flap 18 into the interior 34 of the aircraft. During emergency ventilation operation of the aircraft, when air from the environment 36 around the aircraft is to be supplied through the air outlet valve 10 into the aircraft interior 34, the cover is however situated, as shown in FIGS. 8 and 9, in a position, in which it closes the region of the tail-side air outlet valve aperture portion 26, through which in the arrangement shown in FIGS. 3 to 6 air may still pass from the aircraft interior 34 into the environment 36 around the aircraft. In dependence upon the setting angle of the valve flaps 14, 18 the cover 42 then occupies a position, in which it extends substantially parallel to the aircraft skin 22 over the region of the tail-side air outlet valve aperture portion 26 that is delimited by the pivot axis 16 of the tail-side valve flap 18 and by the—in relation to the air outlet valve 10—tail-side portion of the aircraft skin 22.

If, on the other hand, the air outlet valve 10 is to be used during normal operation of the aircraft, for example during a descent, to remove air from the aircraft interior 34 into the environment 36 around the aircraft, the cover 42 may however be positioned in such a way that it does not hinder the removal of air from the aircraft interior 34 through the region of the tail-side air outlet valve aperture portion 26 situated between the pivot axis 16 of the tail-side valve flap 18 and the—in relation to the air outlet valve 10—tail-side portion of the aircraft skin 22. Otherwise the construction and mode of operation of the air outlet valve shown in FIGS. 7 to 10 correspond to the construction and mode of operation of the arrangement shown in FIGS. 3 to 6.

The invention claimed is:

1. A system for emergency ventilation of an aircraft cabin, comprising
    an air outlet valve for use in an aircraft which is adapted during normal operation of the aircraft as a component of a cabin pressure control system for adjusting a desired pressure level in the aircraft cabin to remove air from an interior of the aircraft into an environment around the aircraft, and which is further adapted during emergency ventilation operation of the aircraft as a component of a system for emergency ventilation of the aircraft cabin to introduce air from the environment around the aircraft into the interior of the aircraft, comprising:
        a nose-side valve flap, which is pivotable about a pivot axis of the nose-side valve flap and is adapted to open or close a nose-side portion of an air outlet valve aperture, and
        a tail-side valve flap, which is pivotable about a pivot axis of the tail-side valve flap and is adapted to open or close a tail-side portion of the air outlet valve aperture, wherein a portion of the tail-side valve flap that in the open state of the tail-side valve flap projects into an air stream flowing around an aircraft skin during cruising of the aircraft is greater than a portion of the nose-side valve flap that in the open state of the nose-side valve flap projects into the air stream flowing around the aircraft skin during cruising of the aircraft; and
    a control unit, which during emergency ventilation operation is adapted to receive signals indicating a defect in an aircraft air-conditioning system that impairs proper ventilation of the aircraft cabin, and which is adapted to control at least one valve flap of the air outlet valve during emergency ventilation operation of the aircraft into its open state so that air from the environment around the aircraft is directed into the interior of the aircraft through the open valve flap.

2. The system according to claim 1, wherein the portion of the tail-side valve flap that in the open state of the tail-side valve flap projects into the air stream flowing around the aircraft skin during cruising of the aircraft extends in the open state of the tail-side valve flap in a direction at right angles to the aircraft skin further into the air stream flowing around the aircraft skin during cruising of the aircraft than the portion of the nose-side valve flap that projects in the open state of the nose-side valve flap into the air stream flowing around the aircraft skin during cruising of the aircraft.

3. The system according to claim 1, wherein the pivot axis of the nose-side valve flap is disposed centrally relative to the nose-side valve flap and or the pivot axis of the tail-side valve flap is disposed centrally relative to the tail-side valve flap.

4. The system according to claim 1, wherein the tail-side valve flap comprises a cover, which is adapted to close a region of the tail-side air outlet valve aperture portion disposed between the pivot axis of the tail-side valve flap and an—in relation to the air outlet valve—tail-side portion of the aircraft skin when the tail-side valve flap is in its open position, in which it opens the tail-side air outlet valve aperture portion.

5. The system according to claim 4, wherein the cover is pivotably connected to the pivot axis of the tail-side valve flap.

6. The system according to claim 4, wherein the cover is controllable by means of a control unit of the cabin pressure control system and or of the system for emergency ventilation of the aircraft cabin into a desired position, in which it opens or closes the region of the tail-side air outlet valve aperture portion disposed between the pivot axis of the tail-side valve flap and an—in relation to the air outlet valve—tail-side portion of the aircraft skin.

7. The system according to claim 1, wherein the control unit is adapted to control the nose-side valve flap and or the tail-side valve flap of the air outlet valve in such a way that it is they are positioned at a setting angle greater than 90° relative to the air stream flowing around the aircraft skin during cruising of the aircraft.

8. A method for emergency ventilation of an aircraft cabin, comprising the steps:
    providing an air outlet valve for use in an aircraft which is adapted during normal operation of the aircraft as a component of a cabin pressure control system for adjusting a desired pressure level in the aircraft cabin to remove air from an interior of the aircraft into an environment around the aircraft, and which is further adapted during emergency ventilation operation of the aircraft as a component of a system for emergency ventilation of the aircraft cabin to introduce air from the environment around the aircraft into the interior of the aircraft, comprising:
    a nose-side valve flap, which is pivotable about a pivot axis of the nose-side valve flap and is adapted to open or close a nose-side portion of an air outlet valve aperture, and
    a tail-side valve flap, which is pivotable about a pivot axis of the tail-side valve flap and is adapted to open or close a tail-side portion of the air outlet valve aperture, wherein a portion of the tail-side valve flap that in the open state of the tail-side valve flap projects into an air stream flowing around an aircraft skin during cruising of the aircraft is greater than a portion of the nose-side valve flap that in the open state of the nose-side valve flap projects into the air stream flowing around the aircraft skin during cruising of the aircraft, and controlling at least one valve flap of the air outlet valve into its open state by a control unit, which during emergency ventilation operation is adapted to receive signals indicating a defect in an aircraft air-conditioning system that impairs proper ventilation of the aircraft cabin, so that air from the environment around the aircraft is directed into the interior of the aircraft through the open valve flap.

9. The method according to claim 8, wherein the nose-side valve flap and or the tail-side valve flap of the air outlet valve is are controlled in such a way that it is they are positioned at a setting angle greater than 90° relative to the air stream flowing around the aircraft skin during cruising of the aircraft.

10. The method according to claim 8, wherein the tail-side valve flap comprises a cover, which is adapted to close a region of the tail-side air outlet valve aperture portion disposed between the pivot axis of the tail-side valve flap and an—in relation to the air outlet valve—tail-side portion of the aircraft skin when the tail-side valve flap is in its open position, in which it opens the tail-side air outlet valve aperture portion, and the cover of the tail-side valve flap is controlled into a desired position, in which it opens or closes the region of the tail-side air outlet valve aperture portion disposed between the pivot axis of the tail-side valve flap and an—in relation to the air outlet valve—tail-side portion of the aircraft skin.

\* \* \* \* \*

UNITED STATES PATENT AND TRADEMARK OFFICE
CERTIFICATE OF CORRECTION

PATENT NO. : 8,915,776 B2
APPLICATION NO. : 12/709887
DATED : December 23, 2014
INVENTOR(S) : Thomas Heuer It is certified that error appears in the above-identified patent and that said Letters Patent is hereby corrected as shown below:

In the Claims

Column 12, Line 18, Claim 3, delete "and or" and insert -- and/or --

Column 12, Line 33, Claim 6, delete "and or" and insert -- and/or --

Column 12, Line 40, Claim 7, delete "and or" and insert -- and/or --

Column 12, Line 42, Claim 7, delete "is they" and insert -- is/they --

Column 13, Line 13, Claim 9, delete "and or" and insert -- and/or --

Column 13, Line 14, Claim 9, delete "is are" and insert -- is/are --

Column 13, Line 14, Claim 9, delete "is they" and insert -- is/they --

Signed and Sealed this
Twenty-first Day of April, 2015

Michelle K. Lee
*Director of the United States Patent and Trademark Office*